United States Patent
Sinyard et al.

(10) Patent No.: US 8,122,927 B2
(45) Date of Patent: Feb. 28, 2012

(54) INNER-TUBE ASSEMBLY FOR BICYCLE WHEEL

(75) Inventors: Michael W. Sinyard, Morgan Hill, CA (US); Chance Regina, Mountain View, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 908 days.

(21) Appl. No.: 11/334,225

(22) Filed: Jan. 18, 2006

(65) Prior Publication Data

US 2007/0084536 A1     Apr. 19, 2007

Related U.S. Application Data

(60) Provisional application No. 60/728,688, filed on Oct. 19, 2005.

(51) Int. Cl.
*B60C 29/04*     (2006.01)
(52) U.S. Cl. .................. 152/429; 152/427; 152/DIG. 11
(58) Field of Classification Search .................. 152/427, 152/428, 429, 430, DIG. 11; 137/231
See application file for complete search history.

(56) References Cited

U.S. PATENT DOCUMENTS

| | | | | |
|---|---|---|---|---|
| 483,172 A * | 9/1892 | Schrader | ........................ | 137/233 |
| 589,878 A * | 9/1897 | Veith | ........................... | 137/223 |
| 634,752 A * | 10/1899 | Honold | ........................ | 137/232 |
| 928,411 A * | 7/1909 | De Vigne | .................. | 152/339.1 |
| 995,961 A * | 6/1911 | Greene | .......................... | 152/430 |
| 999,506 A * | 8/1911 | Levrant | ......................... | 152/428 |
| 1,050,942 A * | 1/1913 | Haas | ............................... | 137/231 |
| 1,313,553 A * | 8/1919 | Nielsen | .......................... | 137/233 |
| 1,395,731 A * | 11/1921 | Rice | ................................ | 152/429 |
| 1,456,357 A * | 5/1923 | Bowerman | ..................... | 156/120 |
| 1,479,010 A * | 1/1924 | Rice | ................................ | 152/429 |
| 1,650,502 A * | 11/1927 | Albert | ........................... | 137/223 |
| 1,938,816 A * | 12/1933 | Ernst | ............................. | 152/367 |
| 1,975,415 A | 10/1934 | Williams | | |
| 2,018,584 A | 10/1935 | Watson | | |
| 2,154,254 A * | 4/1939 | Williams | ....................... | 152/430 |
| 2,285,008 A * | 6/1942 | Bronson | ........................ | 152/430 |
| 2,309,061 A * | 1/1943 | Goff | ............................... | 152/430 |
| 2,731,061 A * | 1/1956 | Clark | ........................... | 152/341.1 |
| 3,911,988 A * | 10/1975 | Richards | ....................... | 152/427 |
| 5,433,488 A | 7/1995 | Chiago | | |
| 5,450,886 A | 9/1995 | Girard | | |
| 5,558,117 A | 9/1996 | McGuinness | | |

(Continued)

FOREIGN PATENT DOCUMENTS

| | | |
|---|---|---|
| CH | 231821 | 5/1944 |
| EP | 0349659 A1 | 1/1990 |
| FR | 2787064 A1 | 6/2000 |

*Primary Examiner* — Kip T Kotter
(74) *Attorney, Agent, or Firm* — Michael Best & Friedrich LLP

(57) ABSTRACT

An inner-tube assembly that includes an inner-tube and a valve assembly. The valve assembly is configured to facilitate the inflation of the inner-tube, and the valve assembly includes a valve core and a valve housing. The valve housing has a lower portion coupled to the inner-tube and an opposite upper portion. At least part of an exterior surface of the lower portion is threaded and at least part of an exterior surface of the upper portion is unthreaded. In another aspect, the inner-tube assembly includes the inner-tube and a valve assembly. An attachment member couples the valve assembly to the inner-tube. The attachment member has a length and a width defining an aspect ratio of width/length, and the aspect ratio is less than about 0.50.

16 Claims, 5 Drawing Sheets

U.S. PATENT DOCUMENTS

| | | |
|---|---|---|
| 5,762,095 A * | 6/1998 | Gapinski et al. ............. 137/223 |
| 6,120,010 A | 9/2000 | Schaffer |
| 6,314,985 B1 | 11/2001 | van der Blom |
| 6,588,446 B2 | 7/2003 | Reinhardt |
| 6,626,501 B2 | 9/2003 | Davidoski |
| 6,631,729 B2 | 10/2003 | van der Blom |

\* cited by examiner

INNER-TUBE ASSEMBLY FOR BICYCLE WHEEL

CROSS-REFERENCE TO RELATED APPLICATIONS

This application claims the benefit of U.S. Provisional Patent Application No. 60/728,688, filed Oct. 19, 2005, the entire contents of which are hereby incorporated by reference.

FIELD OF THE INVENTION

The present invention relates generally to the field of bicycles and, more specifically, to inner-tube assemblies for bicycle wheels.

BACKGROUND OF THE INVENTION

Modern bicycles have pneumatic tires that provide good traction and reduce the transmission of vibrations caused by a rough surface. An inner-tube is commonly used to contain pressurized air within the tire. A valve assembly is coupled to the inner-tube to provide a mechanism for inflating the inner-tube. The valve assembly is commonly positioned through a hole in a bicycle rim so that the free end of the valve assembly is available to receive a pump head for inflating the tire.

One common type of bicycle valve is called a Schrader valve, as illustrated in FIG. 1. A Schrader valve typically includes a rubber-coated housing 10 and a threaded tip 12. A moveable valve core 14 is positioned completely within the valve housing. A valve cap (not shown) can be threaded onto the valve tip 12 to inhibit entry of dirt and moisture into the valve housing 10.

FIG. 2 illustrates another type of bicycle valve called a Presta valve. The Presta valve includes a valve housing 20 having a threaded exterior body 22 and a threaded tip 24 having threads of a different diameter and a different pitch. A moveable valve core 26 is positioned within the housing, and includes a valve stem 28 extending from the threaded tip 24, and a knurled locknut 30 that is used to lock the valve in the closed position. A threaded nut (not shown) can be threaded onto the body 22 to secure the housing 20 relative to the rim 32. A valve cap (not shown) can be threaded onto the valve tip 24 to inhibit entry of dirt and moisture into the valve housing 20.

As noted above, the presence of threads on the exterior of the valve housing on the above-described bicycle valves facilitates the attachment of valve caps and locking nuts. These external threads are commonly engaged by a pump head during the process of inflating the tire. The interaction between the pump head and the external threads has been found to damage the pump head. In addition, removal of the pump head from the external threads can require a significant force, which can cause damage to the pump head, the inner-tube, or both.

The above-described valve housings are secured to the inner-tube to facilitate the pumping of air through the valve housing and into the inner-tube. This process typically includes attaching a rubber patch to the lower end of the valve housing and then positioning the rubber patch over a hole in the inner-tube. The rubber patch is then secured to the inner-tube (e.g., using adhesive, heat, vulcanization, chemical bonding, or any other appropriate process) to seal the valve housing to the inner-tube. These patches are commonly oval in shape and historically have dimensions of about 30 millimeters long and 17 millimeters wide.

Recently, due to the continuous desire to decrease the weight of bicycles, inner-tubes have been made to have a thinner wall thickness. While many bicycle inner-tubes have historically been made with a wall thickness of 1 millimeter or more, many recent bicycle inner-tubes have a wall thickness of less than 1 millimeter, with some having wall thicknesses of 0.6 millimeters or less. These reduced wall thicknesses have resulted in an increased frequency of flat tires caused by air leaking through holes in the inner-tube. These holes are frequently found in the inner-tube near the valve housing.

SUMMARY

The present invention provides an inner-tube assembly, including a valve and an inner-tube, that is designed to decrease the occurrence of holes in the inner-tube in the area around the valve assembly. In one aspect, the valve is designed to have a valve housing including a lower portion with a part that is threaded and an upper portion with a part that is substantially unthreaded. The threading on the lower portion facilitates attachment of a fastener to secure the valve relative to the bicycle rim. The absence of threading from the part of the upper portion of the valve housing facilitates attachment of a pump head to a location of the valve housing that is free of threads, thus reducing the likelihood of damage to the pump head, and further reducing the force required to remove the pump head from the valve housing. In one embodiment, the valve housing can be provided with a threaded tip that facilitates attachment of a valve cap. Preferably the valve tip has a diameter smaller than the non-threaded portion of the valve housing so that the threads on the tip are not significantly engaged by a pump head during the inflating process.

Another aspect of the present invention involves the decrease of the aspect ratio (width/length) of the valve patch. More specifically, while a common valve patch has an aspect ratio of about 0.57 (corresponding with a width of 17 millimeters and a length of about 30 millimeters), the inner-tube of the present invention has a valve patch with an aspect ratio less than about 0.5. In one embodiment, the aspect ratio is about less than 0.45, and preferably less than about 0.40, and most preferably less than about 0.35 (e.g., corresponding with a patch having a width of about 16 millimeters and a length of about 50 millimeters).

DETAILED DESCRIPTION

Figure 1:
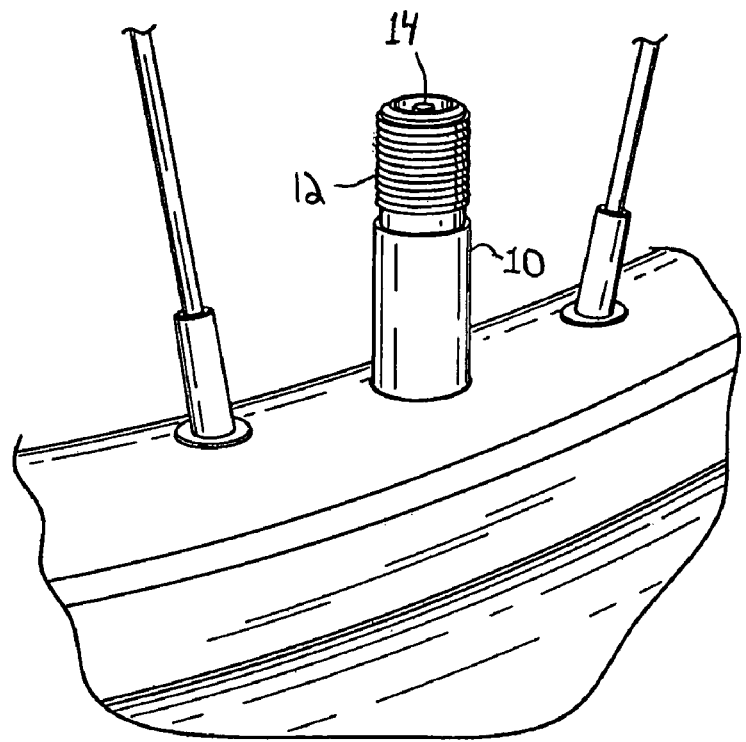
FIG. 1 illustrates a prior art Schrader valve.
Figure 2:
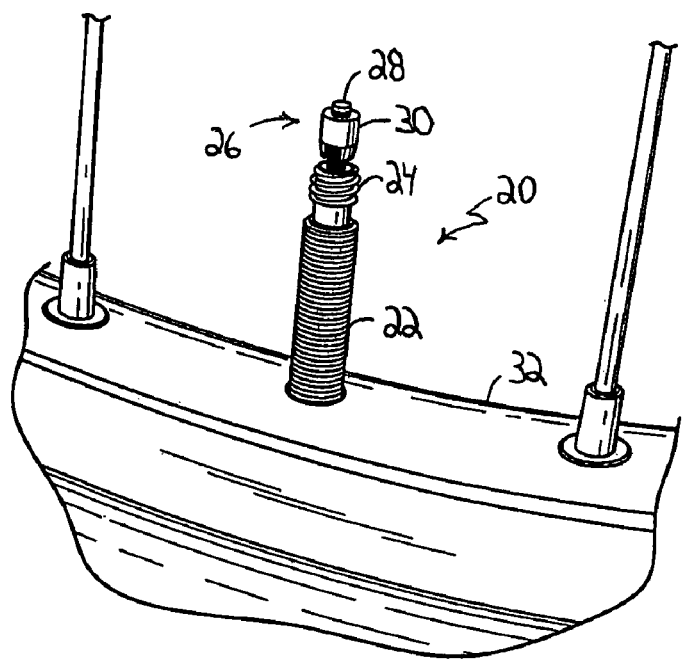
FIG. 2 illustrates a prior art Presta valve.
Figure 3:
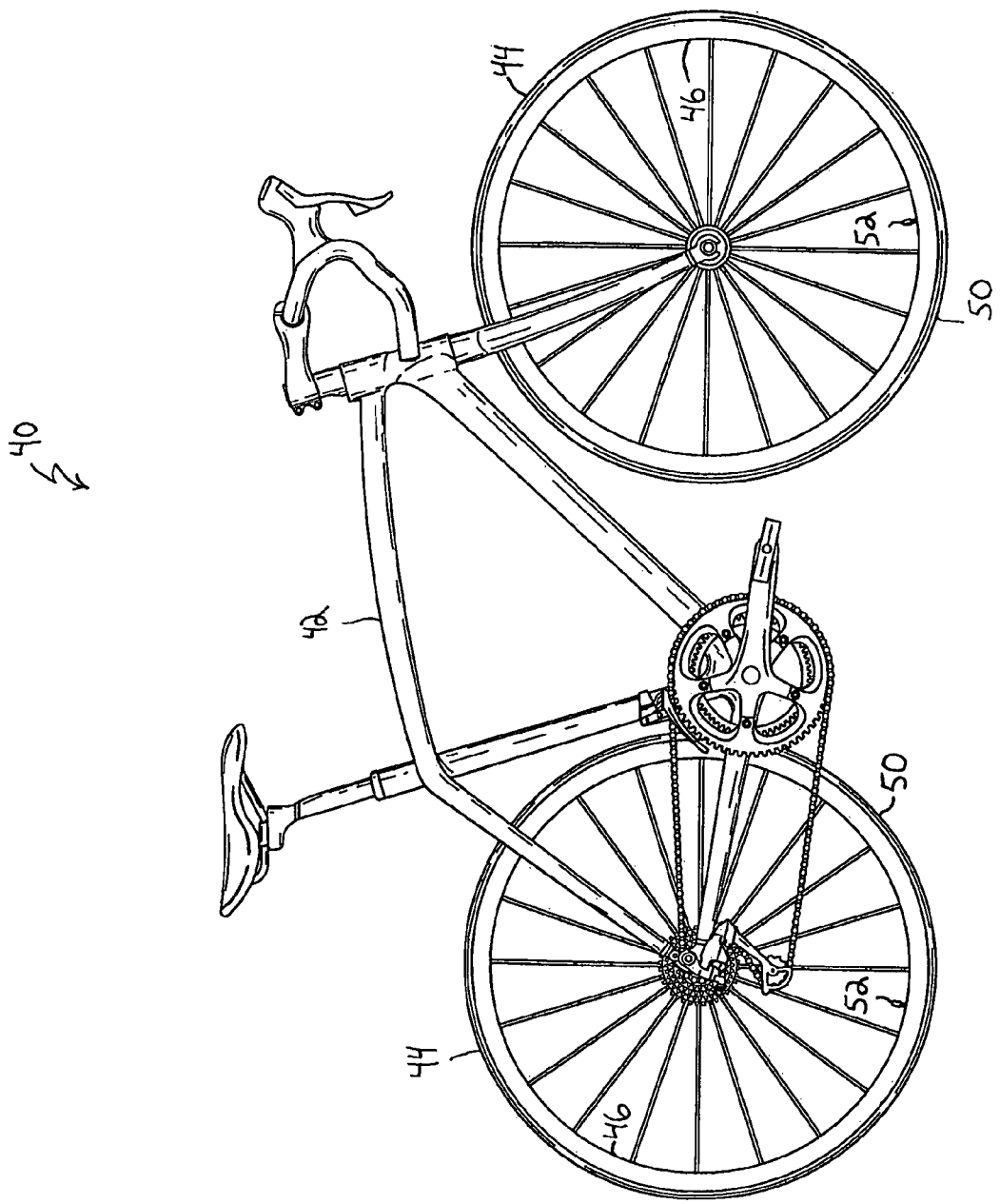
FIG. 3 illustrates a bicycle having a wheel that includes an inner-tube embodying the present invention.
Figure 4:
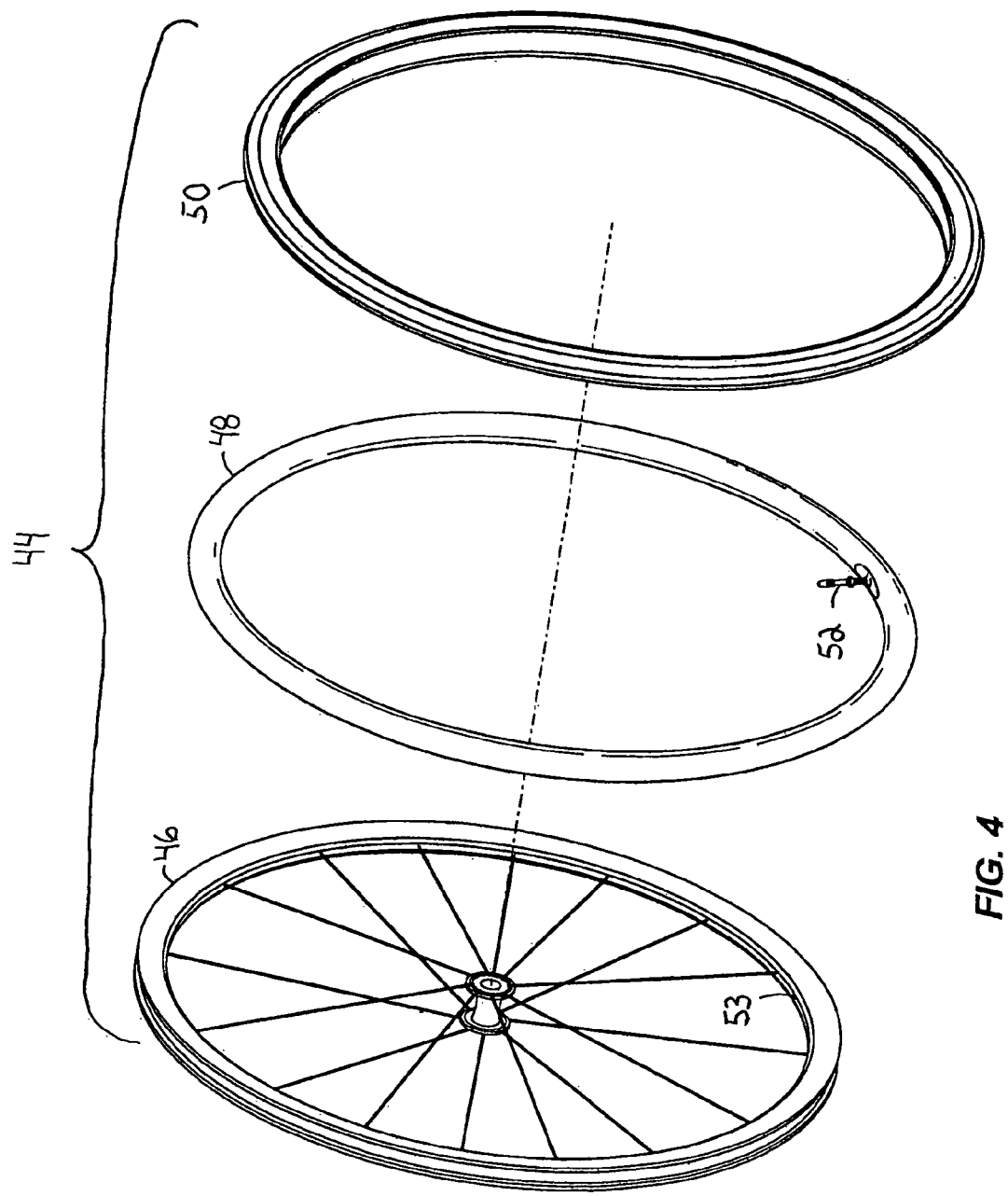
FIG. 4 illustrates an enlarged exploded view of the wheel illustrated in FIG. 3.

The bicycle 40 illustrated in FIG. 3 includes a frame 42 and two wheels 44, as is generally known in the art. As shown in FIG. 4, each of the wheels 44 includes a rim 46, an inner-tube 48 and a tire 50. The inner-tube 48 includes a valve assembly 52 that is positioned through a hole 53 in the rim 46 to facilitate access for inflation of the tire 50.

Figure 5:
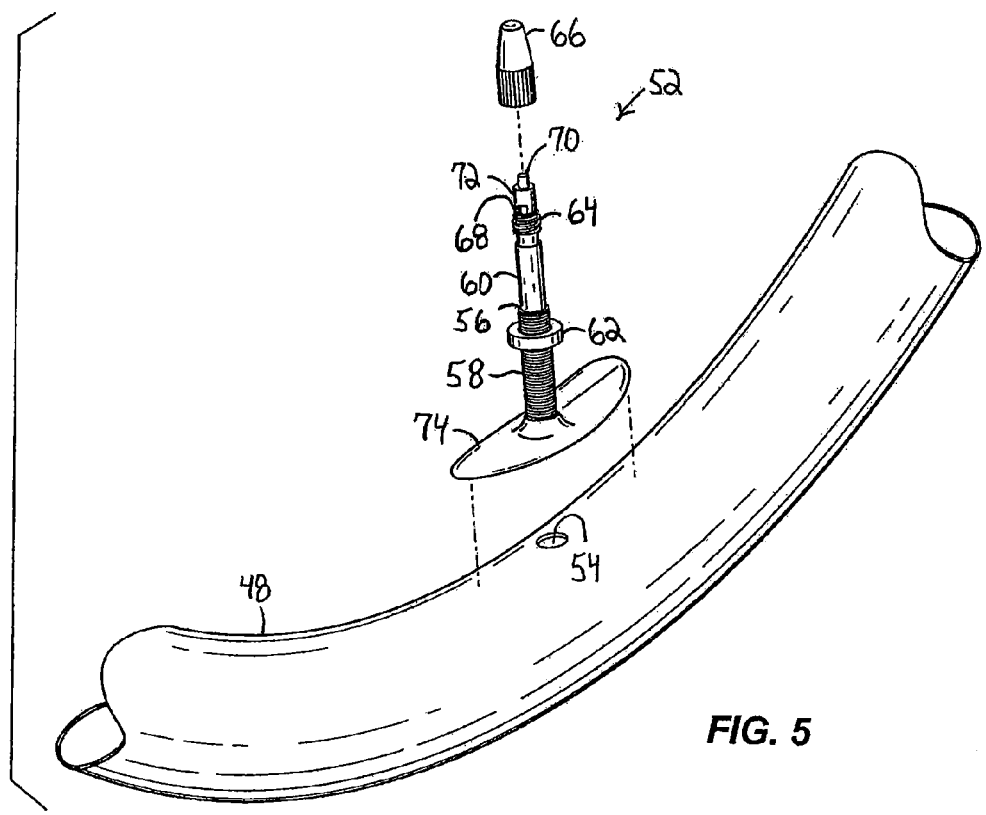
FIG. 5 is an exploded perspective view of a portion of the inner-tube illustrated in FIG. 4.
Figure 7:
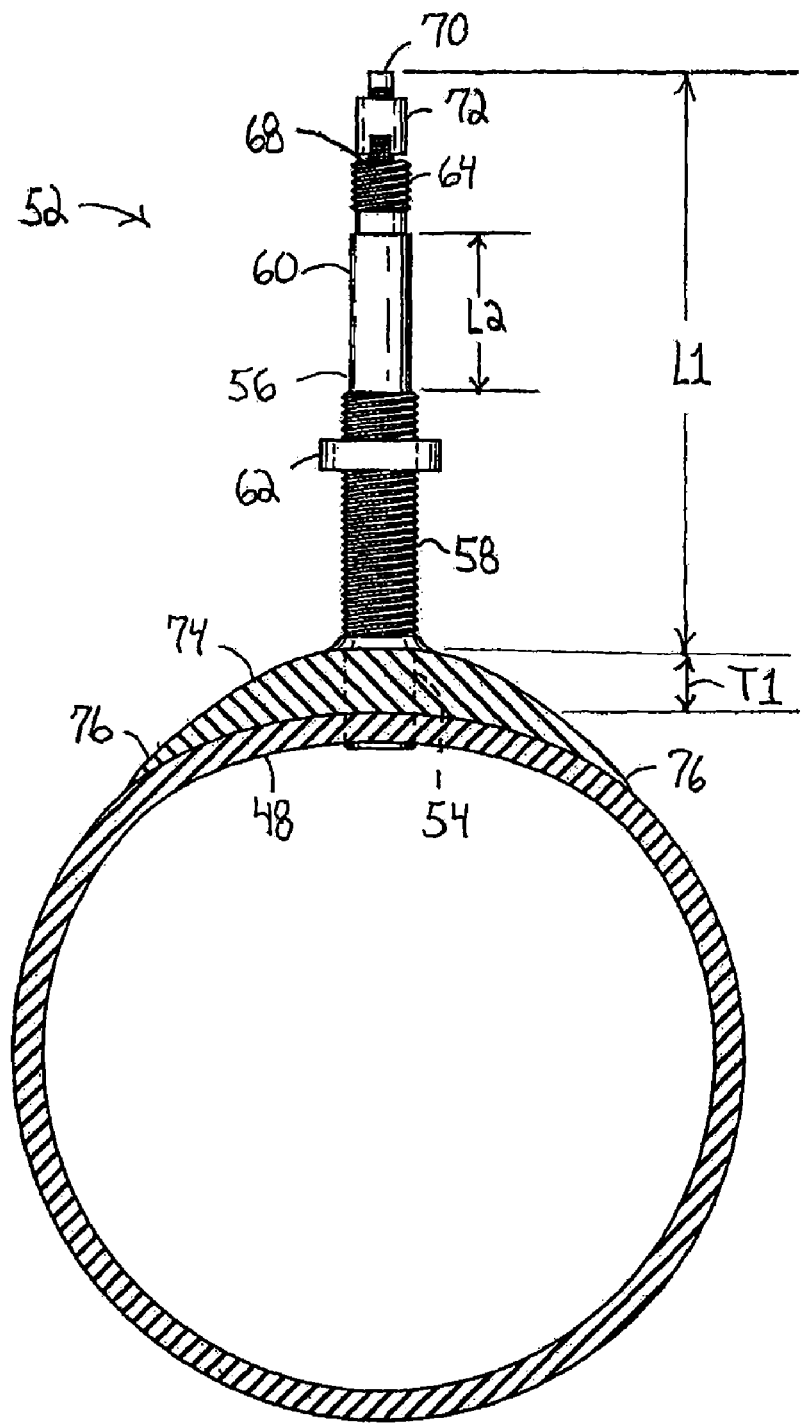
FIG. 7 is a section view taken along line 7-7 of the inner-tube of FIG. 6.

Referring to FIGS. 5 and 7, the valve assembly 52 includes a valve housing 56. In one embodiment, the valve housing 56 has an overall length L1 of about 50 millimeters. In other embodiments, the valve housing can have overall lengths L1 between about 30 millimeters to about 65 millimeters. The overall lengths L1 of the valve housing 56 can differ to correspond with the depth of the rim 46.

The valve housing 56 includes a threaded lower portion 58 and an unthreaded upper portion 60. As illustrated in FIGS. 5 and 7, the upper portion 60 has an external diameter that is smaller than an external diameter of the lower portion 58. In one embodiment, the unthreaded upper portion 60 has a length L2 of approximately about 13 millimeters. In other embodiments, the unthreaded upper portion 60 can have lengths L2 between about 5 millimeters and about 40 millimeters depending on the length L1 of the valve housing 56 and the depth of the rim 46. In one embodiment, the unthreaded upper portion 60 has a length L2 that is at least about 15 percent of the overall length L1 of the valve housing 56. The absence of threading from the upper portion 60 of the valve housing 56 facilitates attachment of the pump head to a location of the valve housing 56 that is free from threads. The absence of threading from the upper portion 60, reduces the likelihood of damage to the pump head, and further reduces the force required to remove the pump head from the valve housing 56. Reducing the force required to remove the pump head from the valve housing 56 reduces the occurrence of the formation of holes in the inner-tube 48 in the area where the valve housing 56 attaches to the inner-tube 48.

The threaded lower portion 58 is designed to receive a fastener 62 to secure the valve housing 56 to the rim 46. While the illustrated fastener 62 is a lock nut, it should be understood that the fastener 62 can include any suitable fastener. The illustrated valve housing 56 further includes a threaded valve tip 64 positioned adjacent to the upper portion 60. The threaded valve tip 64 is adapted to receive a valve cap 66 that inhibits the entry of dirt and moisture into the valve housing 56. The valve tip 64 has an external diameter smaller than the external diameter of the upper portion 60 of the valve housing 56 such that the threads of the valve tip 64 are not significantly engaged by the pump head during the inflating process.

A valve core 68 is positioned within the valve housing 56 and is moveable between an open and a closed position. As is known in the art, the valve core 68 inhibits leakage of air from the inner-tube 48 when in the closed position, and allows entry of air into the inner-tube 48 when in the open position. The valve core 68 includes a stem 70 that extends from the interior of the housing 56 to the exterior of the housing 56, and a knurled lock nut 72 threaded onto the stem 70 in order to facilitate locking the valve core 68 in the closed position. While the illustrated valve assembly 52 includes the valve core 68 similar to the valve core of a Presta type valve, it should be understood that the valve assembly can include other suitable types of valve cores, such as the type of valve core used in a Schrader valve.

A valve patch 74 is secured to the lower portion 58 of the valve housing 56 in order to facilitate attachment of the valve housing 56 to the inner-tube 48. The patch 74 is commonly made from a material, such as rubber, similar to or identical to the material of the inner-tube 48. During the manufacturing process, a hole 54 is formed in the inner-tube 48, and the assembly of the patch 74 and housing 56 is positioned over the hole 54. The patch 74 is then secured to the exterior surface of the inner-tube 48 by any appropriate process such as vulcanization, adhesion, or chemical bonding.

Figure 6:
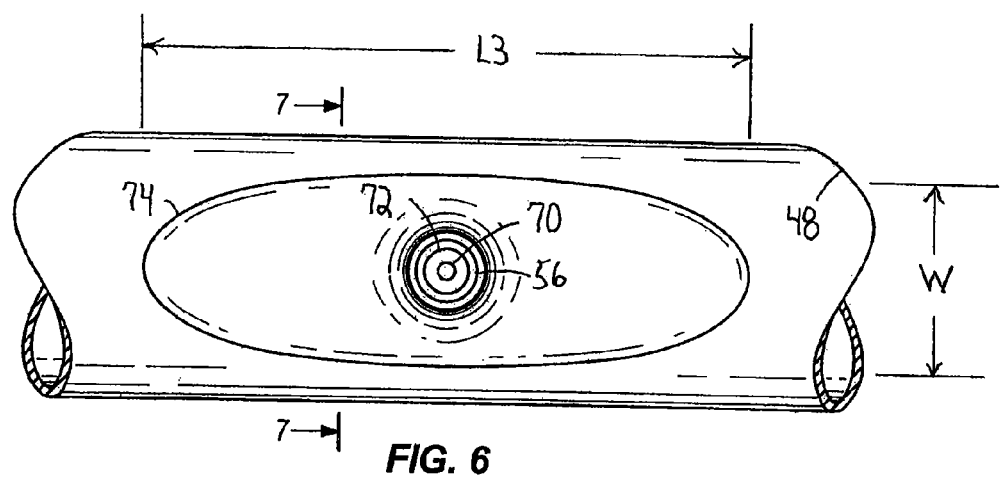
FIG. 6 is an enlarged plane view of the valve assembly and a portion of the inner-tube illustrated in FIG. 5.

Referring to FIG. 7, the illustrated patch 74 has a thickness T1 of approximately about 1.5 millimeters at a central portion, and the patch 74 is tapered to a thin edge 76 at its periphery. In other embodiments, the thickness T1 of the patch 74 can range from about 1 millimeter to about 2 millimeters. Referring to FIG. 6, the patch 74 is dimensioned to have an aspect ratio (width divided by length) of less than about 0.35. More specifically, the illustrated patch 74 has a width W of about 16 millimeters and a length L3 of about 50 millimeters, resulting in an aspect ratio of about 0.32. In other embodiments, the patch can have an aspect ratio of less than about 0.50. While the mechanisms are not completely understood at this time, it has been found that reducing the aspect ratio of the patch 74 reduces the occurrence of the formation of holes in the inner-tube 48 in the area around the patch 74 and housing 56.

What is claimed is:

1. An inner-tube assembly comprising:
   an inner-tube; and
   a valve assembly configured to facilitate the inflation of the inner-tube, the valve assembly including;
      a valve housing having a lower portion coupled to the inner-tube and having an external diameter, the valve housing also having an opposite upper portion having an external diameter smaller than the external diameter of the lower portion, wherein at least part of an exterior surface of the lower portion is threaded and at least part of an exterior surface of the upper portion is unthreaded, and wherein the valve housing further includes a valve tip having an external diameter smaller than the external diameter of the upper portion; and
      a valve core positioned in the valve housing, and
   wherein the valve assembly has an overall length and the unthreaded part of the upper portion has a length that is at least 15 percent of the overall length of the valve assembly.

2. The inner-tube assembly of claim 1, wherein the unthreaded part of the upper portion has a length of at least 5 millimeters.

3. The inner-tube assembly of claim 1, further comprising a fastener coupled to the lower portion, the fastener configured to couple the valve assembly to a rim.

4. The inner-tube assembly of claim 1, wherein the valve tip is positioned adjacent to the upper portion, and wherein the valve tip is threaded to receive a valve cap.

5. The bicycle assembly of claim 1, wherein the unthreaded part of the upper portion has a length that is at least 25 percent of the overall length of the valve assembly.

6. An inner-tube assembly comprising:
   an inner-tube;
   a valve assembly having an overall length and including a valve core and a valve housing having a lower portion coupled to the attachment member and an opposite upper portion, wherein at least a part of an exterior of the lower portion is threaded and at least a part of an exterior surface of the upper portion is unthreaded, and wherein the unthreaded part of the upper portion has a length that is at least 15 percent of the overall length of the valve assembly; and
   an attachment member coupling the valve assembly to the inner-tube, the attachment member having a central portion with a thickness and a peripheral portion with a thickness substantially less than the thickness of the central portion, the central portion coupled to the peripheral portion by a smooth taper, wherein the attachment member also has a length and a width defining an aspect ratio of width/length, and wherein the aspect ratio is less than 0.50 to thereby reduce an occurrence of formation of a hole in the inner-tube in an area around the attachment member.

7. The inner-tube assembly of claim 6, wherein the attachment member is a patch made from substantially the same material as the inner-tube.

8. The inner-tube assembly of claim 6, wherein the thickness of the central portion is at least 1 millimeter.

9. The inner-tube assembly of claim 6, wherein the aspect ratio is less than 0.40.

10. The inner-tube assembly of claim 6, wherein the aspect ratio is less than 0.35.

11. A bicycle comprising:
a frame;
a rim coupled to the frame for rotation;
a tire supported by the rim;
an inner-tube positioned between the rim and the tire;
a valve assembly configured to facilitate the inflation of the inner-tube, the valve assembly having an overall length and including a valve core and a valve housing having a lower portion coupled to the attachment member and an opposite upper portion, wherein at least a part of an exterior of the lower portion is threaded and at least a part of an exterior surface of the upper portion is unthreaded, and wherein the unthreaded part of the upper portion has a length that is at least 15 percent of the overall length of the valve assembly; and
an attachment member coupling the valve assembly to the inner-tube, the attachment member having a central portion with a thickness and a peripheral portion with a thickness that is substantially less than the thickness of the central portion, the central portion coupled to the peripheral portion by a smooth taper, wherein the attachment member also has a length and a width defining an aspect ratio of width/length, and wherein the aspect ratio is less than 0.50 to thereby reduce an occurrence of formation of a hole in the inner-tube at an interface with the rim in an area around the attachment member.

12. The bicycle of claim 11, wherein the attachment member is a patch made from substantially the same material as the inner-tube.

13. The bicycle of claim 11, wherein the thickness of the central portion is at least 1 millimeter.

14. The bicycle of claim 11, wherein the aspect ratio is less than 0.40.

15. The bicycle of claim 11, wherein the aspect ratio is less than 0.35.

16. The bicycle assembly of claim 11, wherein the unthreaded part of the upper portion has a length of at least 5 millimeters.

* * * * *